(12) United States Patent  
Hielscher et al.

(10) Patent No.: US 7,872,400 B2  
(45) Date of Patent: Jan. 18, 2011

(54) ULTRASONIC DEVICE WITH A DISK-SHAPED RESONATOR

(75) Inventors: Holger Hielscher, Teltow (DE); Thomas Hielscher, Stahnsdorf (DE); Harald Hielscher, Stahnsdorf (DE)

(73) Assignee: Dr. Hielscher GmbH, Teltow (DE)

( * ) Notice: Subject to any disclaimer, the term of this patent is extended or adjusted under 35 U.S.C. 154(b) by 161 days.

(21) Appl. No.: 12/235,944

(22) Filed: Sep. 23, 2008

(65) Prior Publication Data

US 2009/0079300 A1 Mar. 26, 2009

Related U.S. Application Data

(60) Provisional application No. 60/974,505, filed on Sep. 24, 2007.

(51) Int. Cl.  
*H01L 41/08* (2006.01)

(52) U.S. Cl. .................. 310/334; 310/325; 310/322

(58) Field of Classification Search ............ 310/323.01, 310/325, 328, 334–337; 134/2, 184  
See application file for complete search history.

(56) References Cited

U.S. PATENT DOCUMENTS 3,891,869 A * 6/1975 Scarpa ................... 310/325
3,983,425 A * 9/1976 Barlow ................... 310/334
4,153,201 A * 5/1979 Berger et al. ............ 239/102.2
4,691,724 A * 9/1987 Garcia et al. ............ 134/169 R
5,172,344 A * 12/1992 Ehrlich ................... 367/152
5,994,818 A * 11/1999 Abramov et al. ........ 310/325
6,140,744 A * 10/2000 Bran ...................... 310/346

* cited by examiner

*Primary Examiner*—Mark Budd  
(74) *Attorney, Agent, or Firm*—Norris, McLaughlin & Marcus, P.A.

(57) ABSTRACT

The present invention refers to an ultrasonic device comprising an ultrasound transducer; and a disk-shaped metallic low-frequency ultrasound (NFLUS) resonator being mechanically connected with the ultrasound transducer on one side of the resonator; a container with an opening on its bottom side and being arranged on the other side of the disk-shaped resonator such that the opening is facing the disk-shaped resonator; an elastic sealing element arranged between the disk-shaped resonator and the container for sealing the container around the opening; and means for supplying a pressing force such that the container is tightened on the resonator during ultrasonication, but can be repeatedly disassembled and assembled after ultrasonication.

17 Claims, 3 Drawing Sheets

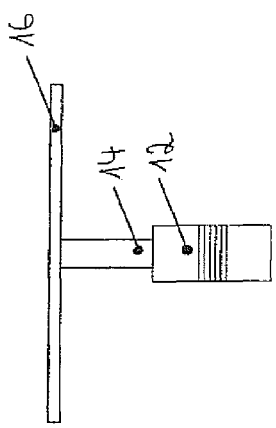
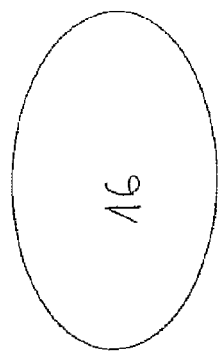
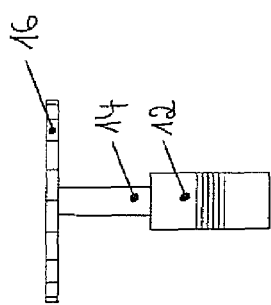
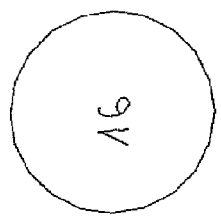
Fig. 3
Fig. 4
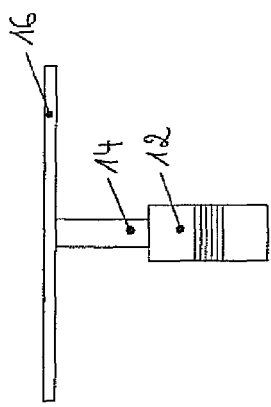
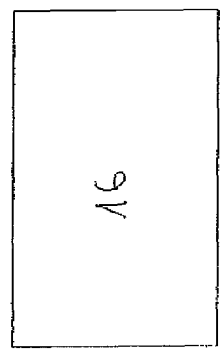
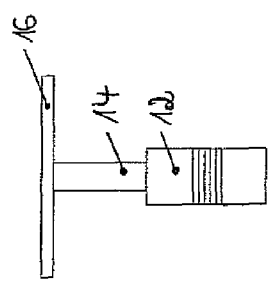
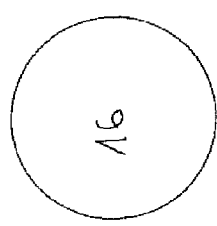
Fig. 5
Fig. 6

ULTRASONIC DEVICE WITH A DISK-SHAPED RESONATOR

FIELD OF THE INVENTION

The invention refers to an ultrasonic device comprising a disk-shaped metallic low-frequency ultrasound (NFLUS) resonator and a bottom free container.

TECHNICAL BACKGROUND OF THE INVENTION

Ultrasonication is used in many applications, such as homogenizing, disintegration, sonochemistry, degassing or cleaning. Generally, an ultrasonic device includes an ultrasonic generator for generating electrical oscillations of ultrasonic frequency, i.e. above audible frequency. This energy is transmitted to a sonotrode. The sonotrode (also referred to as probe, horn or resonator) is a mechanical component that transmits the ultrasonic vibrations from an ultrasound transducer to the material to be sonified. It has to be mounted really tightly to avoid frictions and losses. Depending on the sonotrode geometry, the mechanical vibrations are amplified or reduced. At the sonotrode surface, the mechanical vibrations are coupled into the liquid. This results in the formation of microscopic bubbles (or cavities) that expand during low pressure cycles and implode violently during high pressure cycles. This phenomenon is termed cavitation. Cavitation generates high shear forces at the sonotrode tip and causes the exposed material to become intensely agitated. The amplitude of vibration describes the magnitude of oscillation at the tip of the sonotrode; typical sonotrode amplitudes range from 20 to 250 μm.

However, there is still a demand for improvements in the field of ultrasonic devices, for example for realizing sample preparation units, wherein a container can be easily dissembled. Further, it would be beneficial if the ultrasonic devices would provide the opportunity for intense ultrasound irradiation of liquids, if necessary, also in an ultrasound bath which is larger than in conventional applications. The ultrasonic device should further have a simple geometry, be easy to rinse and its surfaces should be easily accessible. There is further a demand for an ultrasonic device, wherein sedimentation is prevented and ultrasound is introduced from the bottom. In addition, it would be a beneficial opportunity to more easily integrate a stirrer and/or a pump in such an ultrasonic device. Finally, the costs for the parts to be exposed to cavitation, especially the resonator and container, should be as low as possible.

SUMMARY OF THE INVENTION

An object of the present invention is to provide an ultrasonic device of improved characteristics. One or more of the above mentioned aspects is solved or at least lessened by use of the inventive ultrasonic device comprising:
  an ultrasound transducer; and
  a disk-shaped metallic low-frequency ultrasound (NFLUS) resonator being mechanically connected with the ultrasound transducer on one side of the resonator;
  a container with an opening on its bottom side and being arranged on the other side of the disk-shaped resonator such that the opening is facing the disk-shaped resonator;
  an elastic sealing element arranged between the disk-shaped resonator and the container for sealing the container around the opening; and
  means for supplying a pressing force such that the container is tightened on the resonator during ultrasonication, but can be can be repeatedly disassembled and assembled after ultrasonication.

Preferably, the ultrasound transducer is adapted for supplying an ultrasound frequency between 10 and 200 kHz with an oscillation amplitude at the oscillation maximum between 1 and 100 μm. According to another preferred embodiment, the ultrasound transducer is a piezoelectric ultrasound transducer.

The disk-shaped resonator has preferably a circular geometry. In particular, the disk-shaped resonator may have a circular diameter of n*Lambda, wherein n is an integer and Lambda stands for the ultrasound wavelength to be exited. According to another preferred embodiment, the disk-shaped resonator is be made of an element selected from the group of titanium, iron and aluminium or alloys thereof. The disk-shaped resonator has preferably a thickness of 1 to 40 mm. According to another preferred embodiment, the disk-shaped resonator is connected with the ultrasound transducer at a center of the disk-shaped resonator. In a further preferred embodiment, the side of the disk-shaped resonator facing the container is of planar shape.

The container has preferably a volume between 1 and 1000 ml. The container is preferably made of stainless steel. According to another preferred embodiment, the container is construed as a continuous reactor.

Preferably, the elastic sealing element is one of an O-ring, sealing rope and flat seal and acts as an oscillation-decoupling element. According to another preferred embodiment, the elastic sealing element is made of a non-metallic material, in particular one of nitrile butadiene rubber (NBR), ethylene propylene diene M-class rubber (EPDM), fluorinated elastomer (FKM) or perfluoro elastomer (FFKM).

The ultrasonic device may further comprise a stirrer or rotor.

According to another preferred embodiment, the means for supplying a pressing force are construed for charging a pressing force in the range of 1 to 200 N.

BRIEF DESCRIPTION OF THE DRAWINGS

FIG. 3 to FIG. 6 illustrate four alternative embodiments of the disk-shape resonator according to the present invention.

DETAILED DESCRIPTION OF THE EMBODIMENTS

Figure 1A:
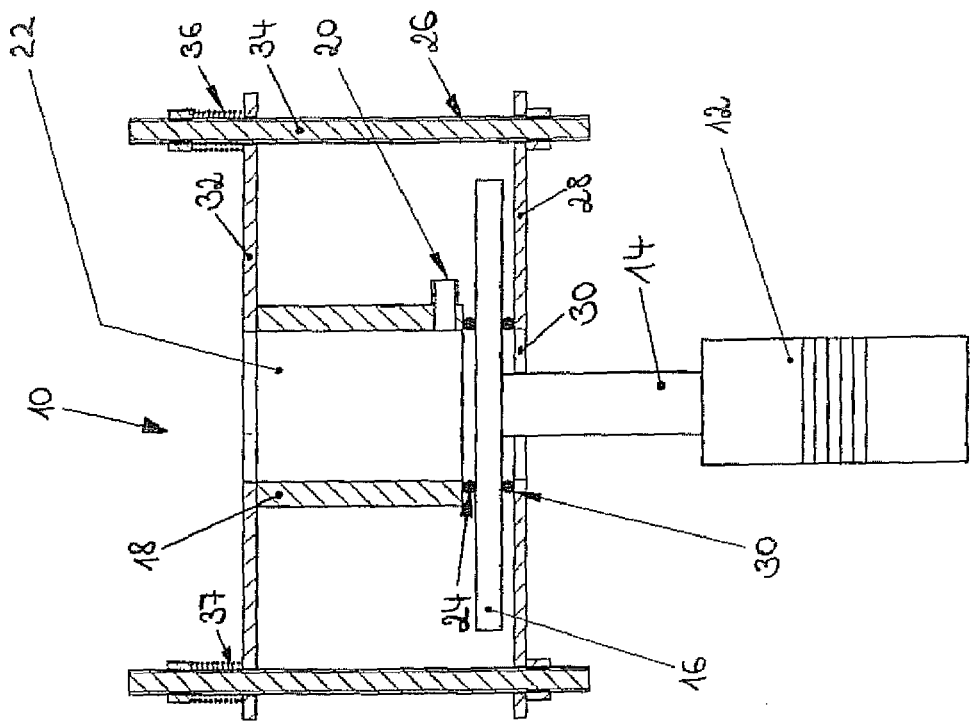
FIGS. 1A and 1B show an ultrasonic device according to a first embodiment of the invention.

An ultrasonic device according to the present invention comprises an ultrasound transducer and a disk-shaped metallic low-frequency ultrasound (NFLUS) resonator being mechanically connected with the ultrasound transducer on one side of the resonator. The ultrasonic device further comprises a container with an opening on its bottom side and being arranged on the other side of the disk-shaped resonator such that the opening is facing the disk-shaped resonator; an elastic sealing element arranged between the disk-shaped resonator and the container for sealing the container around the opening; and means for supplying a pressing force such that the container is tightened on the resonator during ultrasonication, but can be can be repeatedly disassembled and assembled after ultrasonication.

Thus, the disk-shaped metallic low-frequency ultrasound (NFLUS) resonator is excited on one side perpendicular to the surface by one (not several) mechanically connected ultrasound transducer. The ultrasound transducer may have an ultrasound frequency between 10 and 200 kHz, in particular 15 to 50 kHz (for example 30 kHz), and an oscillation amplitude at the oscillation maximum between 1 and 100 μm, in particular 10 to 50 μm (for example 20 μm), in order to apply power densities between 0.1 and 100 W/cm$^2$, in particular 1 to 10 W/cm$^2$ (for example 5 W/cm$^2$), and an ultrasound power of 1 to 1000 Watt, in particular 5 to 200 Watt (for example 50 Watt), to liquids on the side of the resonator opposite the excitation. The ultrasound transducer may be a piezoelectric ultrasound transducer or magnetostrictive sound transducer.

The resonator is formed as a disk and may have circular, oval, rectangular, square, polygon or irregular shape. A circular resonator may have a circular diameter of 1, 2, 3, . . . times Lambda, for example 2*Lambda, wherein Lambda is the ultrasound wavelength to be exited. An oval resonator may have a maximum diagonal from 1 to 30 cm, in particular 3 to 10 cm (for example 5 cm). The thickness of the resonator may be 0.01 to 1.0 times Lambda (for example 0.5*Lambda/2) and/or 1 to 40 mm, in particular 3 to 20 mm (for example 15 mm). The excitation may be achieved from the center of the disk or outside the center. The resonator has no oscillation-decoupling geometry and may have a surface between maximum and revolving node. The surface may be of planar, convex or concave shape. The resonator may be installed horizontally or with a slight angle. Further, the resonator may be made of titanium, stainless steel, aluminium or alloys of titanium, aluminium and iron. The resonator may have an additional coating.

On the side of the resonator opposite to the transducer a container with a volume between 1 and 1000 ml, in particular 5 to 200 ml (for example 50 ml), is tightly pressed against the resonator by a preferably non-metallic elastic oscillation-decoupled element with a pressing force of 1 to 200 N, in particular 5 to 20 N (for example 15 N), such that ultrasound is applied to the liquid residing in the container, without introducing ultrasound oscillations in the container itself, wherein this connection can be repeatedly disassembled and assembled. The container does not have a bottom, which is instead formed by the resonator, wherein a seal, such as a ring seal, is arranged between the container and the resonator at the zero point of the ultrasound oscillation.

The container is pressed on at one side of the resonator with an elastic element, preferably a spring. The container may have an enclosing top and a bottom outlet, for example, tangentially to an interior space of the container or in the rotation direction of a rotor. The container may be pressure resistant against pressures of 1 to 50 bar, in particular 1 to 3 bar. The container may further be construed as a static or continuous batch. The container may be formed of stainless steel, glass, ceramics or plastic and may be electro-polished. An interior space of the container may be of cylindrical, conical or truncated cone shape, especially downwardly tapered.

The elastic and sealing element is proximate to or in a node. The elastic element may be an O-ring, sealing rope or a flat seal as oscillation-decoupling element. The O-ring may be made of of nitrile butadiene rubber (NBR), ethylene propylene diene M-class rubber (EPDM), fluorinated elastomer (FKM) or perfluoro elastomer (FFKM).

The ultrasonic device may further include a temperature sensor, especially a digital temperature sensor having a display and an interface. The sensor may be construed for measurement of temperatures in the range of −50 to 500° C., in particular −10 to 200° C. (for example 0 to 150° C.). The sensor may be used for controlling the ultrasound input or rotor rotation speed and may be attached with screws or a quick-acting closure.

The ultrasonic device may further include a rotor or stirrer which reaches into the interior space of the container from the top or bottom of the container. The rotor or stirrer is sealed for example with an axial face seal. A lift for stirring and/or pumping may be from 0.1 to 10 m, in particular 0.1 to 2 m (for example 0.5 m). The stirrer or rotor may be made of stainless steel, glass, ceramics or plastic and may have a rotation speed of 50 to 2000 rpm, in particular 100 to 1000 rpm (for example 800 rmp). The rotation speed may be regulated, especially voltage-regulated, or unregulated.

The container may be disposed on or adjacent to a generator box. The construction may have a soundproofing cover. A solid measure (capacity) may be 1 to 100 dm$^3$, in particular 10 to 40 dm$^3$ (for example 24 dm$^3$). The construction for supporting the assembly of container, transducer, and resonator may have a weight from 0.5 to 10 kg, in particular 1 to 4 kg (for example 2 kg). The support construction may be made of stainless steel. Other external or integrated devices may be provided, for example measurement devices, in particular particle size measurement devices.

The ultrasonic device may be used for excitation of liquids having a specific viscosity of 0.05 to 250,000 cPs, in particular 1 to 100,000 cPs (for example 1 cPs). The liquid may be an aqueous or non-aqueous solvent, a dispersion or emulsion.

The ultrasonic device may be used as a static reactor or as continuous reactor. The ultrasonic device may further be used as a sample preparation unit for chemical analysis devices or for measurement devices, for example particle size measurement devices. The device may be further used for cleaning of components, for example inkjet cartridges, pipettes, medical devices and tattooing tools. Further, the device may be used for direct or indirect acoustic irradiation of samples, for example test tubes in a water bath.

EXAMPLE 1

Figure 1B:
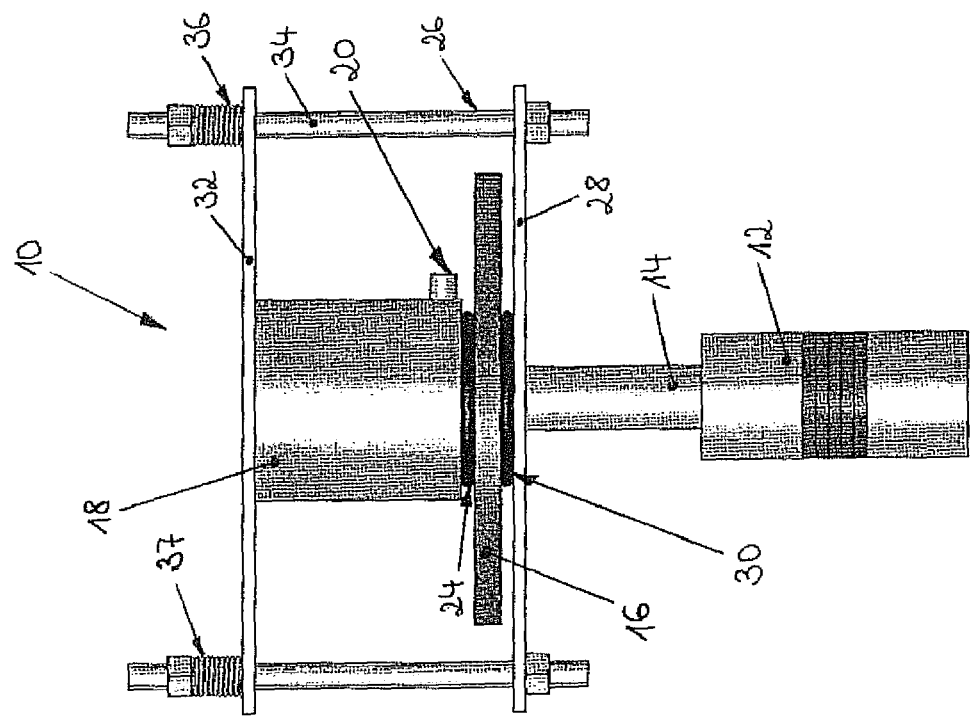

FIG. 1A and FIG. 1B (sectional view of FIG. 1A) show an ultrasonic device according to a first embodiment of the invention. An ultrasonic device 10 includes an ultrasound transducer 12 which is central connected by a booster horn 14 with a disk-shaped resonator 16. A cylindrical and bottom free container 18 is provided on an upper side of the resonator 16. The container 18 is construed as a continuous reactor having an outlet 20 near its bottom and an inlet 22 at its head. An O-ring 24 is provided between the container 18 and the resonator 16. The O-ring 24 acts as a sealing element, i.e. prevents that a liquid provided in an inner chamber of the container 18 leaks through the gap between container 18 and resonator 16 while exited by ultrasonic waves.

The resonator 16 rests upon a bottom plate 28 with a through hole 30 which is part of a support frame 26. An O-ring 30 is provided between the resonator 16 and the bottom plate 28 of the support frame 26. A plate 32 is moveable mounted on guiding pins 34 of the support frame 26 and pressed against an upper surface of the container 18 with a predetermined pressing force by use of springs 36 and 37. The pressing force tightens the container 18 on the resonator 16.

EXAMPLE 2

Figure 2B:
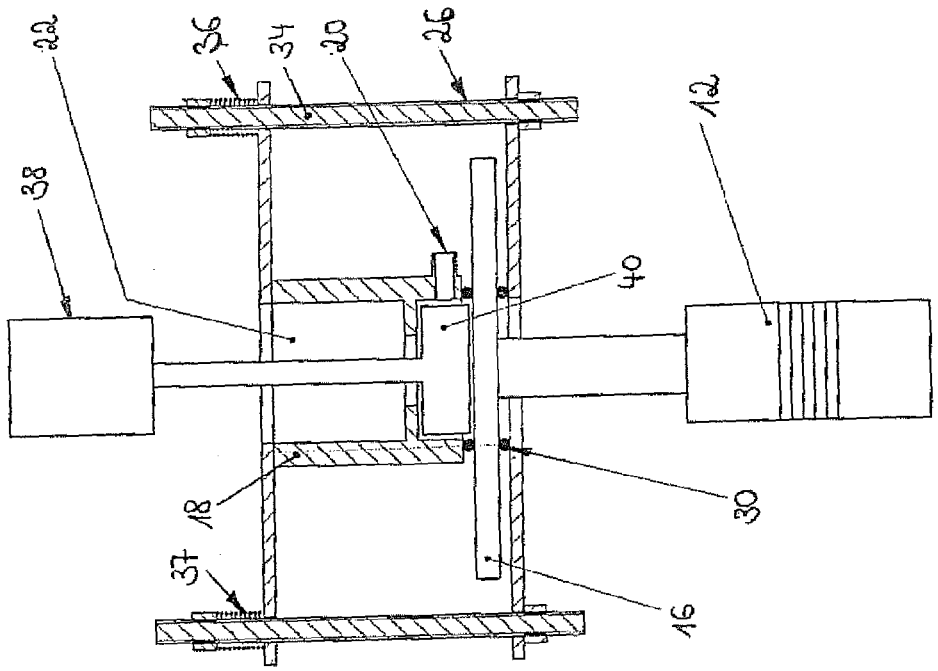
FIGS. 2A and 2B show an ultrasonic device according to a second embodiment of the invention.
Figure 2A:
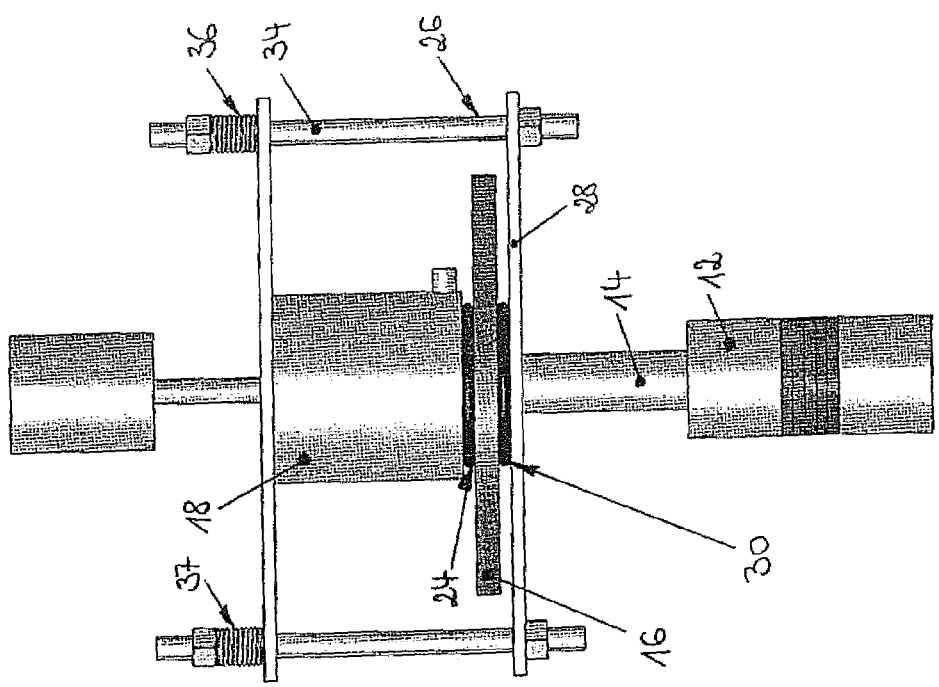

FIG. 2A and FIG. 2B (sectional view of FIG. 2A) illustrate an ultrasonic device according to a second embodiment of the invention. The second embodiment differs from the first embodiment of FIGS. 1A and 1B in that a motor driven stirrer 38 rests with its rotor 40 in a lower part the inner chamber of the container 18.

EXAMPLES 3 THROUGH 6

FIG. 3 to FIG. 6 illustrate four alternative embodiments of the disk-shape resonator according to the present invention. The resonator 16 may be of circular shape (FIG. 3), quadrangle shape (FIG. 4), polygon shape (FIG. 5) or oval shape (FIG. 6).

The invention claimed is:

1. An ultrasonic device comprising:
   an ultrasound transducer; and
   a disk-shaped metallic low-frequency ultrasound (NFLUS) resonator being mechanically connected with the ultrasound transducer on one side of the resonator;
   a container with an opening on its bottom side and being arranged on the other side of the disk-shaped resonator such that the opening is facing the disk-shaped resonator;
   an elastic sealing element arranged between the disk-shaped resonator and the container for sealing the container around the opening; and
   means for supplying a pressing force such that the container is tightened on the resonator during ultrasonication, but can be can be repeatedly disassembled and assembled after ultrasonication.

2. The ultrasonic device of claim 1, wherein the ultrasound transducer is adapted for supplying an ultrasound frequency between 10 and 200 kHz with an oscillation amplitude at the oscillation maximum between 1 and 100 μm.

3. The ultrasonic device of claim 1, wherein the ultrasound transducer is a piezoelectric ultrasound transducer.

4. The ultrasonic device of claim 1, wherein the disk-shaped resonator has a circular geometry.

5. The ultrasonic device of claim 4, wherein the disk-shaped resonator has a circular diameter of n*Lambda, wherein n is an integer and Lambda stands for the ultrasound wavelength to be exited.

6. The ultrasonic device of claim 1, wherein the disk-shaped resonator is made of an element selected from the group of titanium, iron and aluminium or alloys thereof.

7. The ultrasonic device of claim 1, wherein the disk-shaped resonator has a thickness of 1 to 40 mm.

8. The ultrasonic device of claim 1, wherein the disk-shaped resonator is being connected with the ultrasound transducer at a center of the disk-shaped resonator.

9. The ultrasonic device of claim 1, wherein the side of the disk-shaped resonator facing the container is of planar shape.

10. The ultrasonic device of claim 1, wherein the container has a volume between 1 and 1000 ml.

11. The ultrasonic device of claim 1, wherein the container is made of stainless steel.

12. The ultrasonic device of claim 1, wherein the container is construed as a continuous reactor.

13. The ultrasonic device of claim 1, wherein the elastic sealing element is one of an O-ring, sealing rope and flat seal and acts as an oscillation-decoupling element.

14. The ultrasonic device of claim 1, wherein the elastic sealing element is made of a non-metallic material.

15. The ultrasonic device of claim 14, wherein the elastic sealing element is made of one of nitrile butadiene rubber (NBR), ethylene propylene diene M-class rubber (EPDM), fluorinated elastomer (FKM) or perfluoro elastomer (FFKM).

16. The ultrasonic device of claim 1, wherein the ultrasonic device further comprises a stirrer or rotor.

17. The ultrasonic device of claim 1, wherein the means for supplying a pressing force are construed for charging a pressing force in the range of 1 to 200 N.

* * * * *